United States Patent [19]

Zappia

[11] 4,008,525
[45] Feb. 22, 1977

[54] APPARATUS FOR PROCESSING WARE

[75] Inventor: Anthony T. Zappia, Carmel, Ind.

[73] Assignee: Ball Brothers Service Corporation, Muncie, Ind.

[22] Filed: Apr. 19, 1976

[21] Appl. No.: 678,252

[52] U.S. Cl. .......................... 33/174 L; 33/178 R; 209/82

[51] Int. Cl.² .......................................... G01B 3/46

[58] Field of Search ............... 209/73, 74 R, 74 M, 209/75, 82, 88 R; 33/174 R, 174 L, 169 R, 178 R; 74/25

[56] References Cited

UNITED STATES PATENTS

| | | | |
|---|---|---|---|
| 2,759,600 | 8/1956 | Saylor | 209/74 R X |
| 3,268,074 | 8/1966 | Johnson | 209/82 X |
| 3,387,704 | 6/1968 | Powers | 209/82 X |
| 3,464,547 | 9/1969 | Becker | 209/82 X |
| 3,704,623 | 12/1972 | Kulig | 74/86 X |
| 3,728,923 | 4/1973 | Lanore | 74/86 X |
| 3,785,282 | 1/1974 | Kamelander | 74/25 X |
| 3,921,303 | 11/1975 | Zappia | 33/174 R X |

Primary Examiner—Drayton E. Hoffman
Assistant Examiner—Fred A. Silverberg
Attorney, Agent, or Firm—Jenkins, Hanley & Coffey

[57] ABSTRACT

A ware tester comprising a testing station and a conveyor for moving ware past the station, the station including a ware testing tool, and a drive for moving the tool toward and away from the conveyor to engage and disengage the ware and parallel to the conveyor while the tool is engaged with the ware. The drive includes first and second cranks spaced in the direction of conveyor movement and having first and second crank pins, respectively, with adjustable throws to determine the extent of tool travel in the conveyor direction. The tool is mounted on an orbital link for shifting movement toward and away from the conveyor, and the orbital link is supported by the first and second crank pins. The drive also includes a third crank having a third adjustable throw crank pin connected to the tool to drive the tool toward and away from the conveyor. A prime mover synchronously drives the cranks, and the apparatus may desirably comprise two such tools and two sets of three cranks synchronously driven from the same prime mover. The station may include a second driver synchronized to the prime mover to shift a portion of the conveyor to move ware first under one of the testing tools and then under the other.

9 Claims, 3 Drawing Figures

APPARATUS FOR PROCESSING WARE

This invention deals with apparatus for testing items of ware, e.g., frangible containers, as the items move along a conveyor. This invention is especially useful to test, for example, the neck openings of individual glass bottles moving in a path along such a conveyor past the testing apparatus.

There are various well-known types of machines for processing, e.g., testing, individual items of ware, e.g., glass bottles, as the ware moves along a conveyor. For purposes of illustration, the reader is directed to the following U.S. Pat. Nos.: 2,768,656, issued Oct. 30, 1956 to C. L. Day et al., and titled HEADSPACER; 3,100,570, issued Aug. 13, 1963, to J. C. White, and titled APPARATUS FOR GAUGING CONTAINER OPENINGS; 3,268,074 issued Aug. 23, 1966 to J. R. Johnson, and titled GAUGING APPARATUS; 3,387,704, issued June 11, 1968 to W. S. Powers, Jr., and titled APERTURE GAUGING AND SORTING DEVICE; 3,704,623, issued Dec. 5, 1972 to Kulig, and titled DRIVE FOR A CONTAINER PROCESSING MACHINE; 3,815,248, issued June 11, 1974 also to Kulig, and titled APPARATUS FOR PROCESSING CONTAINERS; and my U.S. Pat. No. 3,921,303, issued Nov. 25, 1975, and titled PLUG GAUGE. Also of interest is U.S. Pat. No. 3,728,923 issued Apr. 24, 1973 to Lanore, and titled CUTTING GUIDE, NOTABLY FOR CIGARETTE-MAKING MACHINES.

Many of these references illustrate various methods for conveying individual items of ware, such as glass bottles, past processing apparatus such as, for example, headspacers, plug gauges, pressure testing apparatus, outside dimensional gauges, and the like. Such references also disclose several different kinds of apparatus for engaging items of ware for testing as the items move along a conveyor and disengaging the items after testing has been performed.

It is a primary object of the present invention to provide an improved apparatus for testing ware. The apparatus comprises means for conveying the ware along a path, a testing tool for testing the ware, and means for moving the tool to engage the ware for testing and to disengage the ware after testing as the ware is conveyed along the path. The moving means includes first and second cranks spaced in the direction of the conveyor for moving the testing tool parallel to a first line which is generally parallel to the path of the ware past the testing apparatus. The first and second cranks have first and second adjustable throw crank pins, respectively. The throws of the first and second crank pins determine the length of travel of the testing tool parallel to the first line. An orbital link is supported between the first and second crank pins for movement therewith, and the tool is mounted on the orbital link for reciprocation parallel to a second line perpendicular to the conveyor path. A third crank controls reciprocation of the testing tool parallel to the second line. The third crank has a third crank pin with an adjustable throw to determine the length of travel of the testing tool parallel to the second line. The first, second and third cranks are desirably synchronously driven from a single prime mover to move the testing tool to engage an individual item of ware for testing without disturbing the motion of the ware along the conveyor and to disengage such individual item of ware after testing has been completed while the ware continues to move along the conveyor.

An object of the invention is to provide such a driving apparatus wherein the first and second pins are adjustable to vary the length of travel of the testing tool parallel to the first line and the third pin is adjustable to vary the length of travel of the testing tool parallel to the second line.

In a preferred embodiment, the first, second and third cranks are wheels having parallel axes of rotation, the axes of the first and second wheels lying in a plane generally parallel to the path of the ware past the testing apparatus. The axis of the third wheel lies in a plane perpendicular to the plane of the first and second axes. The wheels include first, second and third radially extending T-shaped slots, one of the slots being formed in one of the axially facing surfaces of each of the first, second and third wheels, respectively. The first, second and third adjustable crank pins are pivot members including means for adjustably engaging the first, second and third T-shaped slots, respectively. The first and second pins are pivotally coupled to the orbital link to cause the link to move in an orbit determined by the radial positions of the first and second pins. The orbital link includes a guide tube slidingly receiving the testing tool, the guide tube being disposed intermediate the ends of the orbital link. The testing tool is coupled to the third crank pin by a bracket which allows the testing tool to move slidingly with respect to the third crank pin parallel to the first line while the tool is positively driven parallel to the second line by the third pin.

An additional object of the present invention is to provide a testing apparatus comprising two such testing tools and two sets of crank-driving apparatus. The two tool and crank-driving apparatus sets are disposed in facing relationship on opposite sides of the conveyor. The second crank-driving apparatus is synchronously driven by the same prime mover which drives the first reciprocating apparatus so that the two testing tools are alternately at opposite extremes in their travels parallel to the second line. That is, one tool is at the bottom of its vertical stroke and engaging an individual item of ware to be tested, and the other tool is at the top of its vertical stroke.

Another object of the present invention is to provide such an apparatus which further includes a shuttle table which reciprocates the ware back and forth transversely of the general direction in which the ware is being conveyed. The operation of the shuttle table is controlled by a second driver synchronized with the prime mover to convey ware first under one of the testing tools to be tested by it, and then under the other testing tool to be tested by it. This speeds up the testing operation.

Other and further objects of the present invention will appear to those skilled in the art to which this invention pertains by referring to the following description of an illustrative embodiment and the accompanying drawings of that illustrative embodiment, in which drawings.

Figure 1:
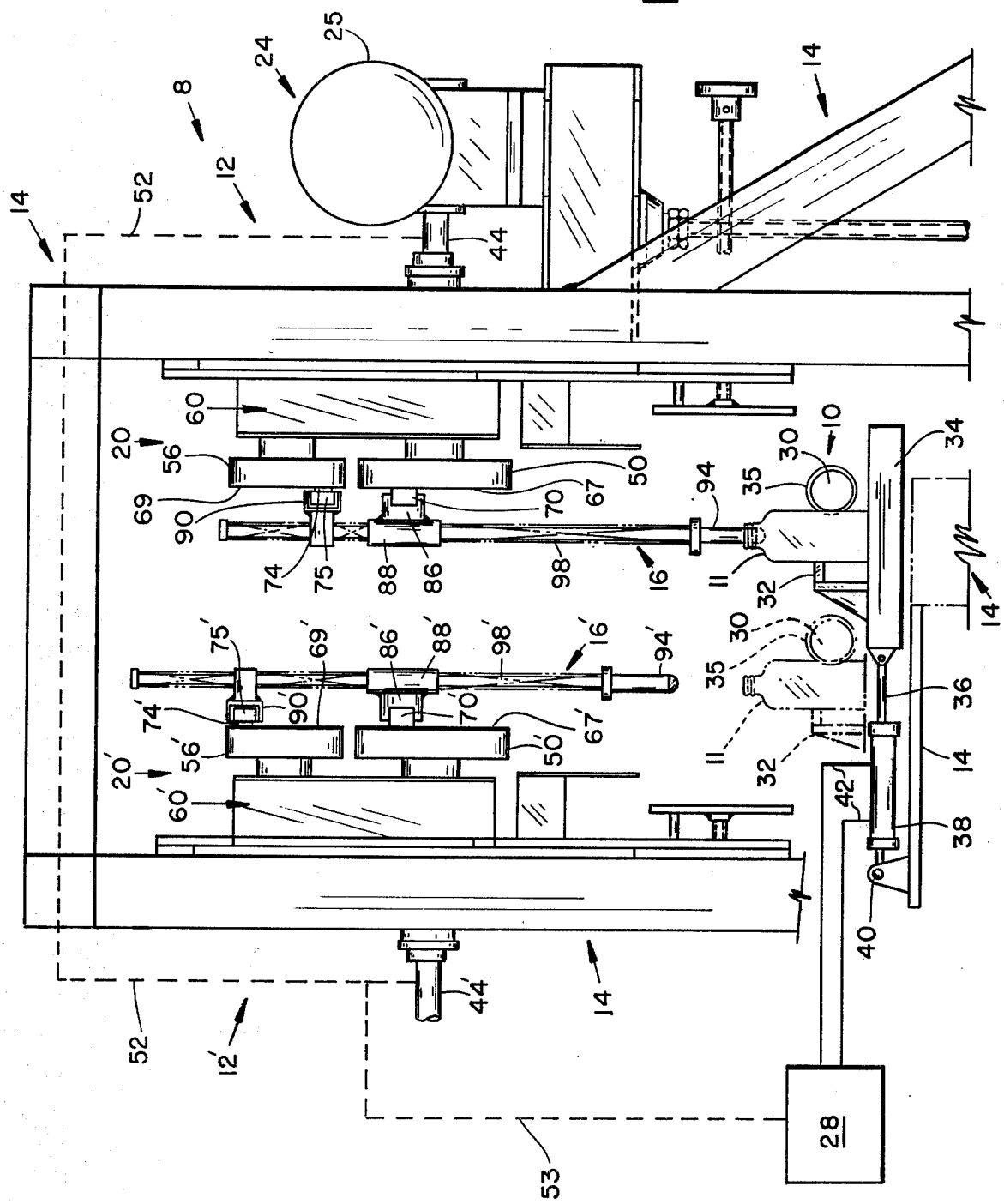
FIG. 1 is a fragmentary front elevational view of an apparatus constructed in accordance with the present invention.

Referring to the drawings, it will be noted that two sets of apparatus are illustrated, the elements of one set being indicated by umprimed numbers and the elements of the other set being indicated by similar primed numbers. The similarly numbered (primed and unprimed) elements perform the same or similar functions in the two sets of apparatus. Reference will be made generally only to the unprimed numbers when the apparatus is described hereinafter. It is to be understood, however, that the description applies equally to the various elements of apparatus indicated by similar primed numbers.

In the Figures, means 10 convey ware 11 (illustratively, bottles) in a path (outwardly from the sheet in FIG. 1, from left to right in FIG. 2) past two sets of testing apparatus 12, 12'. Testing apparatus 12, 12' is supported upon a framework 14 (shown fragmentarily). Testing apparatus 12 includes a testing tool 16, e.g., a rod carrying a pressure testing head, or a plug gauge. Tool 16, illustratively a plug gauge, is mounted for movement parallel to a first line (broken horizontal line 17 in FIG. 2) generally parallel to the ware path along conveyor 10, and for movement parallel to a second line (broken vertical line 18 in FIG. 2) generally perpendicular to the ware path past testing apparatus 12. The movement parallel to the first and second lines 17, 18, respectively, brings testing tool 16 into engagement wth individual items of ware 11 to be tested, and removes testing tool 16 from such individual items 11 after testing has been completed. Of course, each individual item of ware 11 continues in its path along conveyor 10 throughout the testing sequence. The speed of the individual items of ware 11 past testing apparatus 12 may or may not be altered during the testing procedure in accordance with accepted techniques. See, for example, my aforementioned U.S. Pat. No. 3,921,303, col. 2, lines 32–42.

The testing apparatus 12, 12' further includes means 20, 20' for driving testing tools 16, 16', respectively, in synchronism with the conveyor 10 so that tools 16, 16' can engage and disengage individual items of ware 11 as the ware moves along conveyor 10. The illustrative driving means 20, 20' are both synchronized by the same first drive means 24 which includes a prime mover 25. The apparatus further includes a second drive means, a fluid motor 28, which is synchronized to the first to shift pieces of ware 11 transversely of the general direction of movement of conveyor 10. Second drive means 28 can be used to move an individual piece of ware 11 under each of the two individual testing tools 16, 16' (illustrated by the piece of ware 11 in both solid and broken lines in FIG. 1), for example, when tools 16, 16' are to perform two different testing operations on each piece of ware 11. Alternatively, and importantly, the facing arrangement of the reciprocating means 20, 20' and their respective testing tools 16, 16' can, of course, be used to double the capacity of the testing station 8.

The illustrative conveyor 10 includes a conveyor screw 30 and a guide rail 32 mounted on a shuttle table 34. Conveyor screw 30 is constructed with a thread 35, the pitch of which causes each individual item of ware 11 to move between screw 30 and guide rail 32 along shuttle table 34. Shuttle table 34 is reciprocable back and forth transversely of the conveyor path to locate ware alternatively under testing tool 16 or testing tool 16'. The illustrative shuttle table 34 is moved by an operating rod 36 which is attached to a piston (not shown) reciprocable in a cylinder 38. Cylinder 38 is affixed, as at 40, to framework 14. Cylinder 38 is operated upon commands passed thereto through lines 42 from second drive means 28. It will be appreciated that the fluid motor 28 can be controlled timely to shift the table 34 by limit switches (not shown).

The rotation of conveyor screw 30, the operation of second drive means 28 and the operation of the first synchronized drive means 24 are all synchronized with one another. Of course, all of these synchronized motions can be driven from a single source, e.g., the prime mover 25 illustrated in FIG. 1.

Prime mover 25 also drives, through shafts 44, 44', a pair of first cranks or crank members 50, 50'. Synchronization of members 50, 50' is diagrammatically illustrated by broken line 52 between shafts 44, 44' in FIG. 1.

Synchronization of second drive means 28 with prime mover 25 is diagrammatically illustrated by broken line 53 between line 52 and second drive means 28. First crank members 50, 50' are illustratively wheels. These first crank members 50, 50', in turn, synchronously drive second crank members 54, 54' and third crank members 56, 56', all of which are also wheels, through belts 60, 60' which are trained about wheels 50, 54, 56, and 50', 54', 56', respectively.

Figures 2, 3:
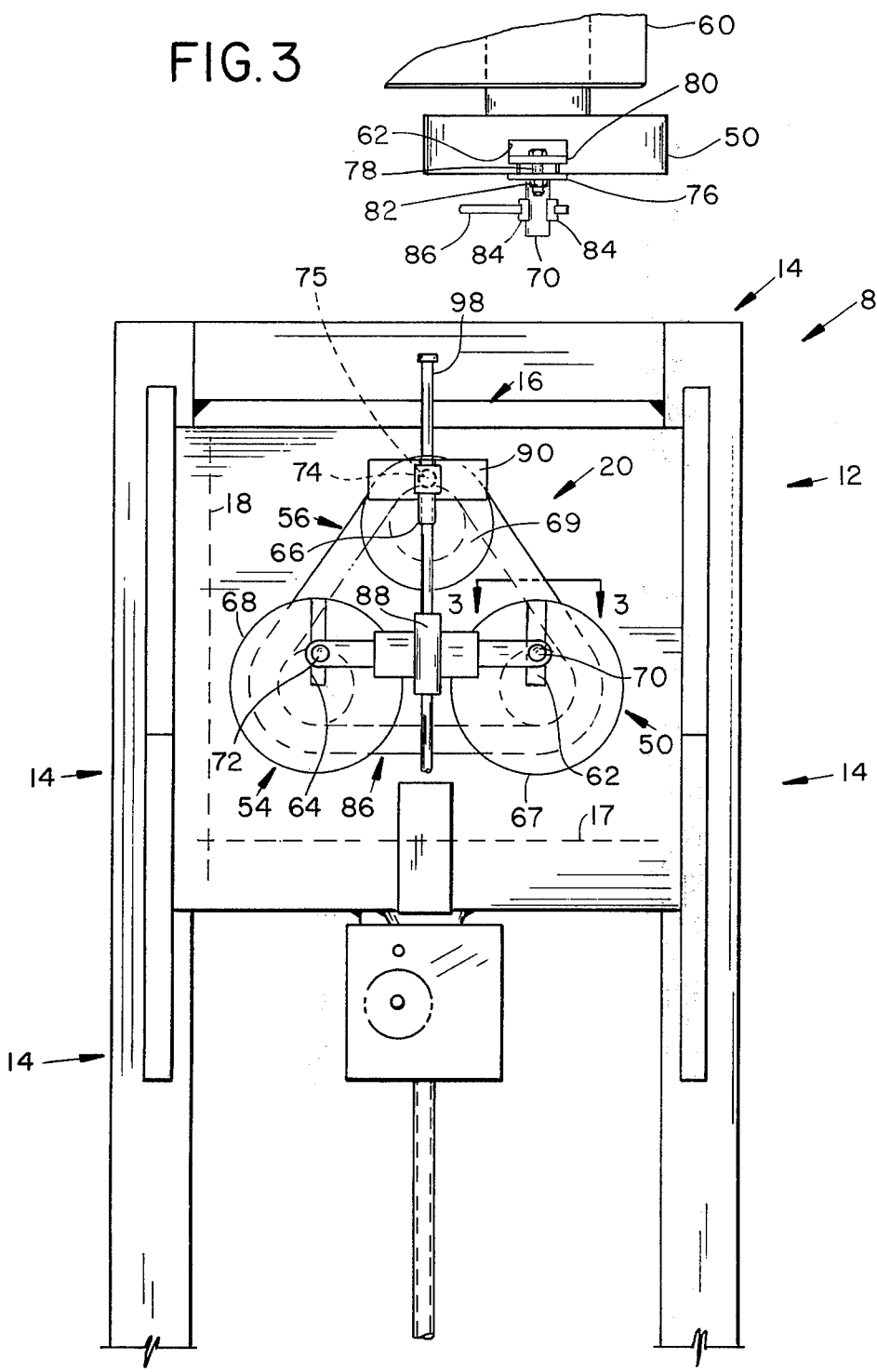
FIG. 2 is a fragmentary side elevational view of the apparatus of FIG. 1.
FIG. 3 is a fragmentary sectional view taken generally along section lines 3—3 of FIG. 2.

Referring now to FIGS. 2–3, each of wheels 50, 54, 56, has a radially extending slot machined into an axially facing surface thereof. As illustrated in FIG. 2, wheels 50, 54, 56 have slots 62, 64, 66 machined into their axially outwardly facing surfaces 67, 68, 69, respectively. Slots 62, 64, 66 have T-shaped transverse sections and are equipped with crank pins 70, 72, 74, respectively. Each crank pin 70, 72, 74 is adjustably positioned in its respective T-shaped slot 62, 64, 66, a predetermined desired radial distance outwardly from the axis of its respective crank member 50, 54, 56. The construction of an illustrative one of these crank pins, crank pin 70, is illustrated in FIG. 3.

Illustrative crank pin 70 includes an outer clamp member 76 attached by one or more bolts 78 to an inner clamp member 80. A nut 82 on each bolt 78 need only be loosened to adjust the position of the crank pin 70 to a desired distance radially outwardly from the axis of rotation of the wheel 50 in T-shaped slot 62. Clamp members 76, 80 are then drawn together by tightening bolts 78 to fix the position of crank pin 70 radially outwardly from the axis of rotation of crank member 50.

There are, of course, corresponding crank pins 70', 72', 74' in corresponding radially extending T-shaped slots 62', 64', 66' (not shown) of wheels 50', 54', 56', respectively.

Crank pins 70, 72 are pivotally connected by bushing bearings 84 (see FIG. 3) to opposite ends of an orbital link member 86. An orbital link member 86' is similarly pivotally connected at its opposite ends to crank pins 70', 72'.

Orbital link member 86 includes, intermediate its ends, a guide tube 88 with a vertically extending cylindrical opening therethrough for slidingly receiving and guiding a portion of testing tool 16. Testing tool 16 also includes, upwardly from guide tube 88, a bracket 90 having a generally C-shaped vertical cross-section (see FIG. 1). A bearing surface on the outer end 75 of crank pin 74 is slidingly received in this generally horizontally extending bracket 90 for free horizontal movement therein. Crank pin 74 supports bracket 90 and thereby supports testing tool 16. Tool 16 moves vertically in response to the vertical component of movement (parallel to broken line 18 in FIG. 2) of crank pin 74 as crank member 56 rotates. A corresponding guide tube 88' and bracket 90' guide and support testing tool 16' from its respective crank members 50', 54', 56'.

The positions of the adjustable crank pins 70, 70' and 72, 72' radially outwardly from the axes of rotation of their respective crank members 50, 50' and 54, 54' govern the motion of the orbital links 86, 86' (including guide tubes 88, 88'), respectively, and thus control the horizontal motion (parallel to broken line 17 in FIG. 2) of testing tools 16, 16'. The locations of crank pins 74, 74' radially outwardly from the axes of rotation of their respective crank members 56, 56', respectively, determine the extent of vertical travel of testing tools 16, 16'.

Testing tools 16, 16' are received in guide tubes 88, 88', respectively, which provide for vertical movement of tools 16, 16' independently of the vertical positions of orbital links 86, 86'. Further, the horizontally freely sliding fit of end 75 of crank pin 74 within bracket 90 allows the horizontal position of guide tube 88, and thus of tool 16, to be determined by the positions of crank pins 70, 72 independently of the horizontal component of movement of crank pin 74. Thus, it may be seen that the horizontal component of the path followed by testing tool 16 is adjustable to meet the demands of any particular application by adjusting the throws of crank pins 70, 72, i.e., by adjusting their radial displacements from the axes of rotation of crank members 50, 54. It may further be seen that the vertical component of the path in which testing tool 16 moves is adjustable to meet the demands of any particular application by varying the throw of crank pin 74, i.e., by adjusting its radial displacement from the axis of rotation of crank member 56 in T-shaped slot 66.

The testing tools 16, 16' illustrated in FIG. 1 are both plug gauges of the type illustrated and described in, for example, my aforementioned published United States Patent Application. Of course, other types of plug gauges or other testing tools, e.g., pressure testing heads, exterior dimension gauges, and the like, can be adapted for use with the reciprocating apparatus of the present invention.

With the instant driving apparatus 20, 20' it is desirable to have testing tools 16, 16', comprising testing heads or probes 94, 94' mounted on rods 98, 98', respectively, which rods are slidingly received in guide tubes 88, 88', and securely attached to brackets 90, 90', upwardly from the guide tubes. Of course, rods 98, 98' can be solid or hollow cylinders or can be of other desired shape. Additionally, each rod 98, 98' can carry multiple testing heads or probes in order to test, for example, two successive individual items of ware 11 moving along conveyor 10.

It is to be understood that heads 94, 94' can be provided which perform two different tests on each individual item of ware 11. The second drive means 28 can be synchronized by, for example, the motion or position of either or both of rods 98, 98' to cause the apparatus 30-38 to move an individual item of ware 11 first under one of heads 94, 94' to subject the item to one test, and then under the other of these heads to subject the item to a different test. Flexible guide segments (not shown) can be used on the sections of conveyor (not shown) carrying ware 11 to and from shuttle table 34 for testing and after testing has been completed to insure that the ware is properly aligned on the shuttle table and on such sections of conveyor.

Second drive means 28 can consist of, for example, switches mounted on framework 14 and actuated by the reciprocation of testing tools 16, 16' to control pneumatic solenoid valves (not shown) in second drive means 28. These solenoid valves can control the motion of the piston in cylinder 38 to move shuttle table 34 back and forth.

What is claimed is:

1. An apparatus for testing ware comprising a testing station and means for conveying ware past said station, said conveying means defining a conveying path, said testing station including a first test member and first means for moving said first test member from a starting position toward said conveying path to engage ware, along the path in the direction of movement of the ware, away from the path to disengage the ware, and then to return to said starting point, said first moving means comprising first and second cranks spaced apart along said conveyor path with their axes parallel and extending transversely to said path, each said crank having a radially displaced crank pin extending axially outwardly therefrom, an orbital link having opposite ends supported respectively on said crank pins, means for mounting said first test member on said link for movement thereon toward and away from said conveyor path, a third crank having an axis parallel to said first and second crank axes and having a third radially displaced crank pin extending axially therefrom, means for connecting said first test member to said third crank pin, and first means for synchronously driving said cranks, said first synchronous drive means comprises an endless flexible means trained about said first, second and third cranks said first, second and third cranks including means for adjusting the radial displacements of said first, second and third crank pins, respectively, the radial displacement of said first and second crank pins being adjustable to vary the extremes of motion of said first test member in its motion along said conveying path, the radial displacement of said third crank pin being adjustable to vary the extremes of motion of said first test member in its motion toward and away from said conveying path.

2. Apparatus according to claim 1 wherein said first, second and third cranks are wheels having axially facing surfaces, said adjusting means being, respectively, means for defining first, second and third radially extending T-shaped slots in said axially facing surfaces, said orbital link comprising a guide tube for slidingly receiving said first test member, said guide tube being disposed intermediate the ends of said link, and means for slidingly connecting said first test member to said third pin to allow said first test member to move slidingly parallel to a first line with respect to said third pin while said first test member is positively driven parallel to a second line by said third pin, said first line being generally parallel to said conveying path and said second line being generally perpendicular to said conveying path.

3. Apparatus according to claim 1 and further comprising a second test member and second means for moving said second test member, said second moving means and test member being disposed in facing relationship to said first moving means and test member on the opposite side of said conveying path from said first moving means and test member, said second moving means being driven by said first synchronous driving means so that said first and second test members are alternately at opposite extremes of their travels.

4. Apparatus according to claim 3 and further including means for shuttling said ware back and forth transversely of said conveying path and second means for driving said shuttle means in synchronism with said first driving means to move the ware from a position for testing by said first test member to a position for testing by said second test member.

5. Apparatus according to claim 4 wherein said first and second test members comprise plug gauges.

6. In an apparatus for processing ware comprising a processing station and means for conveying ware past said station, said station including a first processing member and means for moving said processing member through a cycle of movement from a starting point toward said conveying means to engage ware, along the conveying means in the direction of movement of the ware, away from the conveying means to disengage the ware and then to return to said starting position, the improvement in which said station comprises a second processing member and second moving means, said first and second processing members and their respective moving means being disposed on opposite sides of said conveying means, means for synchronously driving said first and second moving means such that said processing members are at opposite points in their cycles of movement, and means for shifting said conveying means transversely to shift ware alternately to be engaged by said first and second processing members.

7. The improvement of claim 6 and further comprising means for coupling said synchronous driving means to said conveyor shifting means to synchronize the shifting of said conveying means to the movement of said first and second processing members.

8. The improvement of claim 7 wherein said shifting means comprises a fluid motor, a shuttle mechanism for shuttling a portion of the conveying means adjacent said first and second moving means back and forth transversely of the general direction of motion of ware on said conveying means to move the ware first under one of said processing members and then under the other, and means for coupling the fluid motor to the shuttle mechanism.

9. The improvement of claim 6 wherein each of said first and second moving means comprises first and second crank members for moving a respective one of said processing members through said cycle of movement, said first and second crank members having first and second crank pins, respectively, an orbital link for moving its respective processing member along the path of said ware past said station, said link being supported on said first and second pins for movement therewith, the throws of said first and second pins determining the length of travel of said processing member along said path, a third crank member for controlling the movement of its respective processing member toward and away from said path, said third crank member having a third pin for determining the length of travel of said processing member toward and away from said path, said processing members being coupled to their respective links for movement with respect to such links toward and away from said path, said processing members further being coupled to their respective third crank pins for movement with respect to such pins generally along said path, and means for synchronously driving said first, second and third cranks.

* * * * *

UNITED STATES PATENT OFFICE
CERTIFICATE OF CORRECTION

Patent No. 4,008,525            Dated February 22, 1977

Inventor(s) Anthony T. Zappia

It is certified that error appears in the above-identified patent and that said Letters Patent are hereby corrected as shown below:

Column 2, line 7, after "length" insert -- of travel --.

Column 3, line 1, "umprimed" should be -- unprimed --.

Column 6, line 33, after "cranks" (first occurrence), insert a comma.

Column 6, line 36, "displacement" should be -- displacements --.

Signed and Sealed this

Seventeenth Day of May 1977

[SEAL]

Attest:

RUTH C. MASON
*Attesting Officer*

C. MARSHALL DANN
*Commissioner of Patents and Trademarks*